June 24, 1941.  D. D. WINTERS  2,246,563
LIQUID LEVEL INDICATION AND CONTROL
Filed June 13, 1940
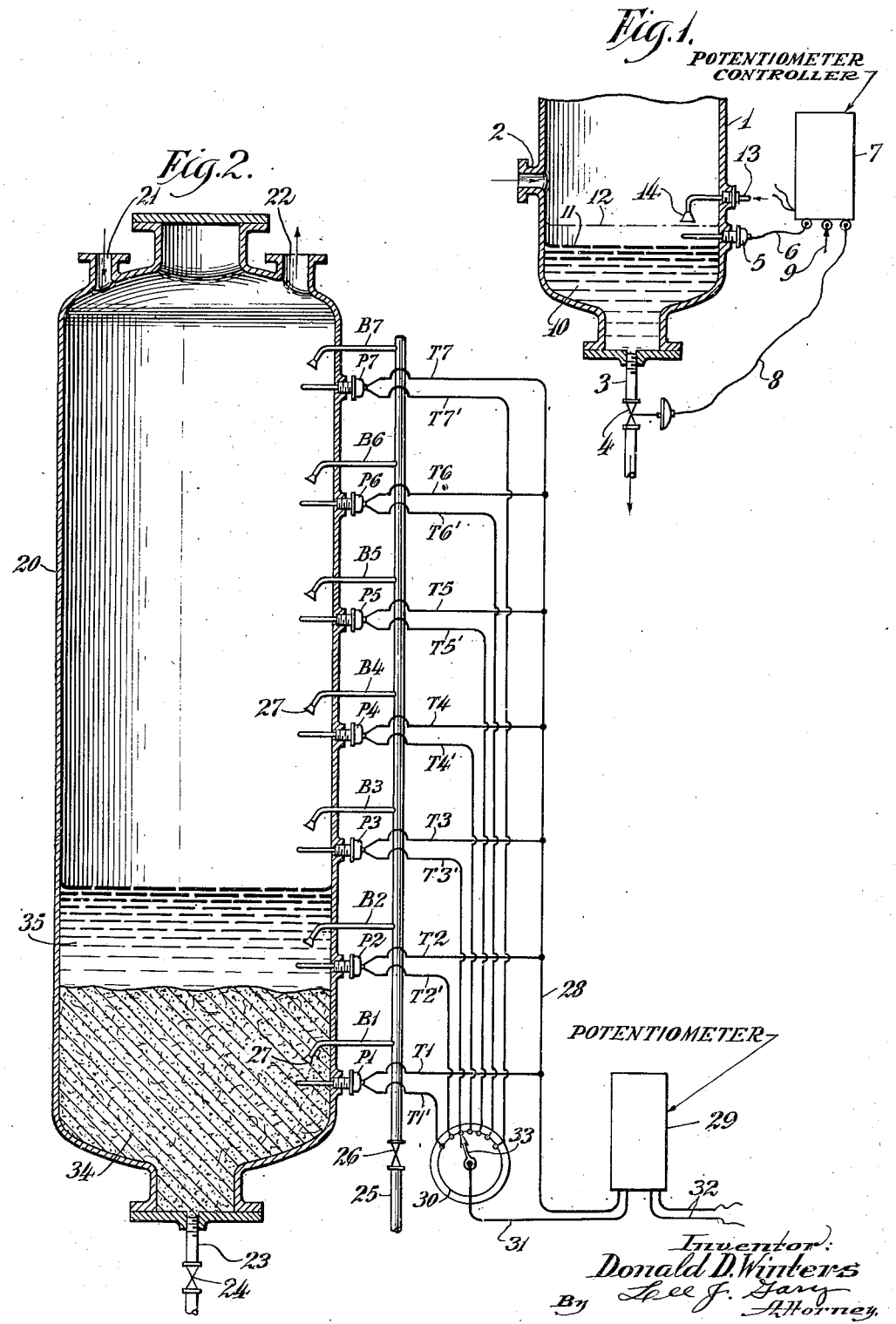

Patented June 24, 1941

2,246,563

UNITED STATES PATENT OFFICE 2,246,563

LIQUID LEVEL INDICATION AND CONTROL

Donald D. Winters, Compton, Calif., assignor to Universal Oil Products Company, Chicago, Ill., a corporation of Delaware Application June 13, 1940, Serial No. 340,279

7 Claims. (Cl. 196—132)

This invention is directed to an improvement in the method and means of indicating and/or controlling the level of liquid in a vessel of the type in which one or more thermocouples are connected to the indicating or control instrument, the operation of which is governed by changes in the temperature at the thermocouple junction or junctions resulting from variations in the level of liquid within the vessel.

Liquid level indicating or control systems of the general type above described operate satisfactorily only when there is a pronounced difference between the temperature of the liquid within the vessel and the space therein not occupied by the liquid. The present invention makes this type of system useful where a low temperature difference ordinarily exists between the liquid within the vessel and the space therein not occupied by the liquid. This is accomplished by spraying the thermocouple or thermocouples with a fluid of substantially different temperature from that of the liquid. As the liquid level builds up within the vessel above the thermocouple and bathes it in cooler or hotter liquid, as the case may be, the effect of the hotter or cooler fluid of the spray is largely dissipated in the body of liquid and a stronger impulse than would otherwise be obtained is generated in the thermocouple due to the more pronounced temperature difference. Thus, more positive impulses are transmitted by the thermocouple to the indicating or control instrument.

The accompanying diagrammatic drawing illustrates several adaptations of the improvement provided by the invention to liquid level indicating and control systems of the general type above mentioned.

Fig. 1 of the drawing shows in longitudinal section the lower portion of a vertically disposed cylindrical vessel, with means for maintaining a predetermined level of liquid therein, in accordance with the features of the invention.

Fig. 2 of the drawing illustrates, in longitudinal section, another vertically disposed cylindrical vessel wherein a level of liquid is allowed to build up, with means for determining the liquid level within the vessel in accordance with the features of the invention.

Referring now to Fig. 1, reference numeral 1 designates the vessel which is provided with inlet connection 2 and liquid outlet conduit 3 having valve 4 disposed therein.

A thermocouple 5 of any well known form is provided and extends through the walls of the vessel at approximately the desired liquid level to be maintained therein. The thermocouple communicates through a two-conductor line 6 with potentiometer controller 7 which may be any well known form of this type of control instrument.

In the particular case illustrated, valve 4 is a diaphragm type control valve actuated by air pressure transmitted thereto through controller 7, the diaphragm of the valve being connected with the controller through conduit 8. Air for actuating valve 4 is admitted to controller 7 through line 9.

A stream of fluid is admitted to the vessel through inlet connection 2 and liquid components thereof or liquid condensed therefrom accumulates within the vessel when valve 4 is closed or not opened sufficiently. A body of liquid 10 is indicated within the lower portion of the vessel and the level of this body of liquid may be allowed to vary slightly from approximately that indicated at 11 to approximately that indicated at 12.

An inlet conduit 13 terminates within the vessel in a suitable spray head or the like 14 disposed a short distance above the junction end of thermocouple 5. Fluid of substantially different temperature from that of the body of liquid 10 is introduced through line 13 to contact pyrometer 5 and affect the temperature of the thermocouple junction when the level of the body of liquid within the vessel is beneath the thermocouple. While this condition prevails, impulses transmitted from the thermocouple to the potentiometer controller are translated therein into a force which functions to admit air from line 9 into conduit 8 and keep valve 4 in a closed or partially closed position. When the level of the body of liquid builds up sufficiently to immerse the thermocouple, the spray from nozzle 14 is largely dissipated in the body of liquid and ceases to have any substantial effect upon the thermocouple junction. Thus, with a substatnial difference in temperature between the spray and the body of liquid within the vessel, a temperature change of much larger magnitude than would otherwise be obtained occurs at the thermocouple junction with changes in the level of liquid accumulated in the vessel. The different potential generated at the thermocouple junction when it is immersed in the liquid is transmitted through line 6 to controller 7 and is therein translated into a force which functions to stop or decrease the admission of air from conduit 9 to conduit 8, and allows valve 4 to open, permitting liquid to be discharged from the body thereof in the vessel through line 3 at a more rapid rate and lowering the liquid level to beneath the thermocouple. The spray from nozzle 14 then becomes effective again and the pronounced change in the potential, generated at the thermocouple junction, functions through controller 7 to closed valve 4 or restrict the opening therethrough. Thus, a level of liquid which varies only slightly, from just above the thermocouple junctions to just beneath the same, is automatically maintained within the vessel.

Obviously, when the body of liquid which accumulates within the vessel is substantially above atmospheric temperature, the fluid introduced through conduit 13 may, most conveniently, be substantially cooler and, when the temperature of the body of liquid is substantially below atmospheric, the fluid supplied through line 19 may, most conveniently, be at a substantially higher temperature. When the body of liquid which accumulates within the vessel is at substantially atmospheric temperature, the fluid introduced through line 13 may be substantially above or substantially below atmospheric temperature, whichever is most convenient.

As an illustration of the utility of the embodiment of the invention illustrated in Fig. 1, we may assume that the vessel here illustrated is a well insulated vaporizing or flash distilling chamber of a hydrocarbon oil cracking system to which a mixture of liquid and vaporous hydrocarbons are supplied at a temperature of approximately 680° F., a separation of vaporous and liquid products being effected within the chamber without additional heating. Ordinarily, there would not be a sufficient difference between the temperature of the body of liquid immediately beneath its surface and the temperature of the vapors at a point immediately above the surface of the body of liquid to permit automatic control of the liquid level within relatively close limits by means of a control system such as illustrated in Fig. 1, since commercial forms of thermocouples and potentiometers are not sufficiently sensitive to minute temperature changes. However, by introducing a spray of cooling fluid, such as, for example, hydrocarbon oil distillate or the like from any desired source, at substantially atmospheric temperature into the chamber in the manner illustrated, the pronounced temperature changes which occur at the thermocouple junction with small fluctuations in the level of the liquid from above to slightly beneath the thermocouple and vice versa, will be of sufficient magnitude to effect positive and appreciable changes in the potential generated at the thermocouple junction and permit use of a control system of the type illustrated. A system of this type is more positive and accurate than float type controllers, particularly as applied to controlling the liquid level in vessels handling heated hydrocarbons comprising heavy oils which tend to deposit coke.

Referring now to Fig. 2, a vertically disposed cylindrical vessel, shown in cross-sectional elevation, is designated by the reference numeral 20. Heated fluid is supplied to the upper portion of the vessel through inlet connection 21 and liquid components of this stream collect within the lower portion of the vessel, the body of liquid being allowed to build up within the vessel as the operation progresses. Vaporous components of the mixture supplied to the vessel may be removed from the upper portion thereof through outlet connection 22. A drain line 23 having valve 24, which is normally closed, is provided at the lower end of the vessel.

A plurality of thermocouples P1, P2, P3, P4, P5, P6, and P7 extend through the walls of the vessel at spaced points in its height to provide a plurality of thermocouple junctions within the interior of the vessel. Cooling fluid is admitted through conduit 25, valve 26 and a plurality of branch conduits indicated at B1, B2, B3, B4, B5, B6 and B7, respectively, into the vessel above the corresponding thermocouples. Each of the branch conduits terminates in a suitable nozzle or spray device 27 which directs the cooling fluid over the thermocouple junction end of each of the pyrometers.

A plurality of wires T1 to T7 inclusive connect one side of the respective thermocouples P1 to P7 inclusive with potentiometer 29 through line 28. Other wires T1' to T7' inclusive connect the other side of the thermocouples P1 to P7 inclusive with one side of a suitable switch 30, the opposite pole of which comprises a rotor 33 connected by wire 31 with potentiometer 29. Electrical energy for motivating the pyrometer is supplied thereto through wires 32. By manipulation of rotor 33, the circuit may be completed from any of the thermocouples through switch 30 to the potentiometer whereby the latter will indicate or record the temperature of the corresponding thermocouple junction and, when desired, the rotor of the switch may be automatically operated by a motor functioning through a time cycle controller to periodically establish contact between wire 31 and the terminal of each of the wires T1' to T7' inclusive so that, with a recording potentiometer, a continuous record may be kept of the temperature at each of the thermocouple junctions. Multiple point potentiometers of this type with the switch and switch control mechanism incorporated as a part of the instrument are now well known in the art.

As an example of the operation of the device illustrated in Fig. 2, we will assume that vessel 20 is operated as a coking chamber, highly heated hydrocarbon oil to be coked being supplied thereto through inlet connection 21 and vaporous products resulting from the coking operation being removed from the chamber through outlet connection 22. The heavy residual components of the heated oil are distilled to substantially dry coke in the chamber and the deposited coke is allowed to accumulate therein until the chamber is filled to the desired level. Ordinarily, a substantial body of liquid and semi-liquid residual material exists above the level of the substantially dry coke accumulated in the chamber and, in order to maintain the desired outage or vapor space in the chamber at the completion of its operation, it is advantageous to know the level of the coke bed and the level of the body of liquid as the operation progresses. In the case illustrated, a bed of coke is indicated at 34 and the body of liquid and semi-liquid residue above the coke bed is indicated at 35. Thermocouple P1 is embedded in the body of coke, thermocouple P2 is immersed in the liquid or semi-liquid material above the coke bed and the remaining thermocouples P3 and P7 inclusive are being washed and cooled with the spray of cooling fluid from conduit 25. With the levels of the liquid and coke at the points indicated in the drawing thermocouple P2 will show the highest temperature on the potentiometer chart. Thermocouple P1 will show a somewhat lower temperature and thermocouples P3 and P7 inclusive will show the lowest temperatures. Thus, the potentiometer chart will show that the coke level is somewhere between thermocouples P1 and P2 and the liquid level is at a point between thermocouples P2 and P3. As the liquid level is brought higher within the chamber and coke is built up therein, the particular thermocouple immersed in the liquid will show the highest temperature, while those embedded in the coke will show somewhat lower temperatures and those above the liquid level will show still lower temperatures.

I claim as my invention:

1. In a process wherein an appreciable body of liquid is maintained within a vessel, a change in the level of said body of liquid being detectable from changes in the potential generated by a thermocouple which is immersed in said liquid when the level of said body is high and not immersed therein when the level of said body is low, the improvement which comprises directing a stream of fluid of a sufficiently different temperature than that of said liquid body towards said thermocouple in a manner to contact the same and to appreciably alter the potential which would otherwise be generated therein when the level of said body of liquid is beneath the thermocouple but is substantially dissipated in said body of liquid when the thermocouple is immersed in the latter, to appreciably increase the difference in potential generated by the thermocouple when it is immersed and when it is not immersed in said body of liquid.

2. In a process wherein an appreciable body of heated liquid is maintained within a vessel, a change in the level of said body of liquid being detectable from changes in the potential generated by a thermocouple which is immersed in the heated liquid when said level is high and is disposed above said body of liquid when the level thereof is low, the improvement which comprises directing a stream of a substantially cooler fluid towards said thermocouple in a manner to contact the same and appreciably reduce the potential which would otherwise be generated therein when the level of said body of liquid is beneath the thermocouple but is substantially dissipated in said body of liquid when the thermocouple is immersed in the latter, to appreciably increase the difference in potential generated by the thermocouple when it is immersed and when it is not immersed in said body of liquid.

3. In a process wherein an appreciable body of relatively cool liquid is maintained within a vessel, a change in the level of said body of liquid being detectable from changes in the potential generated by a thermocouple which is immersed in said liquid when the level of said body thereof is high and is disposed above the body of liquid when the level thereof is low, the improvement which comprises directing a stream of substantially hotter fluid toward and into with thermocouple to appreciably increase the potential which would otherwise be generated therein when the level of said body of liquid is beneath the thermocouple but is substantially dissipated in said body of cooler liquid when the thermocouple is immersed in the latter, to appreciably increase the difference in potential generated by the thermocouple when it is immersed and when it is not immersed in said body of liquid.

4. An apparatus of the character described comprising, in combination, a vessel adapted to accumulate an appreciable body of liquid therein, a thermocouple disposed in said vessel with its junction substantially at the desired level of said body of liquid, means comprising a conduit terminating adjacent the junction of said thermocouple for directing a stream of fluid toward the latter and into contact with the same when the liquid level is beneath the thermocouple junction and to be substantially dissipated in said body of liquid when the level thereof is above the thermocouple junction, and means including a valved conduit communicating with the lower portion of said vessel and a potentiometer controller communicating with operating mechanism of said valve and with said thermocouple for regulating the discharge of liquid from said body in response to changes in the potential generated by said thermocouple.

5. An apparatus of the character described comprising, in combination, a vessel adapted to accumulate a body of liquid of increasing volume therein, thermocouples disposed within the vessel at spaced points along its height, each of said thermocouples being connected with an instrument for indicating changes in the potential generated by each of the thermocouples, means comprising conduits terminating within the vessel adjacent the thermocouple junctions for directing a stream of fluid toward each of the thermocouple junctions to contact and alter the potential generated by those thermocouples which are disposed above said body of liquid within the vessel and to be substantially dissipated in said body of liquid adjacent those thermocouples which are immersed therein.

6. In combination with a hydrocarbon oil cracking system having a vapor-liquid separating chamber to which a stream of conversion products of the cracking operation are supplied in heated state and wherein an appreciable body of liquid conversion products is allowed to accumulate, means for maintainin a level of said body of liquid within the chamber at a substantially constant predetermined point which comprise a thermocouple with its junction disposed at said predetermined level within the chamber, means comprising a conduit terminating within the vessel adjacent said thermocouple junctions for directing a stream of cooling fluid toward the latter to contact and cool the same when the liquid level is beneath said predetermined point and to be substantially dissipated in the body of hotter liquid when the level thereof is above said predetermined point, and means responsive to changes in the potential generated by said thermocouple for controlling the quantity of liquid removed from said body thereof.

7. In combination with a hydrocarbon oil cracking system having a vapor-liquid separating chamber to which a stream of conversion products of the cracking operation are supplied in heated state and wherein a body of liquid components of said stream is allowed to build up as the operation progresses, means for determining the level of said body of liquid within the chamber comprising a plurality of thermocouples with their junctions disposed within the vessel at spaced points along its height, a plurality of conduits terminating within a chamber adjacent said thermocouple junctions for directing cooling fluid toward each of the latter to contact and cool these thermocouple junctions which are above the level of liquid within the chamber and to be substantially dissipated within the body of liquid adjacent those thermocouple junctions which are disposed beneath the liquid level, each of said thermocouples being connected with an indicating instrument responsive to changes in the potential generated by said thermocouples.

DONALD D. WINTERS.